United States Patent
Yoshimura

(10) Patent No.: US 8,700,241 B2
(45) Date of Patent: Apr. 15, 2014

(54) DRIVE CONTROL DEVICE FOR STANDBY FOUR-WHEEL DRIVE VEHICLE

(75) Inventor: Takahiro Yoshimura, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 13/501,641

(22) PCT Filed: Oct. 19, 2009

(86) PCT No.: PCT/JP2009/068037
§ 371 (c)(1),
(2), (4) Date: Apr. 12, 2012

(87) PCT Pub. No.: WO2011/048660
PCT Pub. Date: Apr. 28, 2011

(65) Prior Publication Data
US 2012/0203416 A1    Aug. 9, 2012

(51) Int. Cl.
B60L 15/20        (2006.01)
B60K 6/00         (2007.10)
B60T 8/17         (2006.01)

(52) U.S. Cl.
USPC ............................. 701/22; 303/152; 701/70

(58) Field of Classification Search
USPC ............... 180/165, 242, 243, 248, 446, 65.1, 180/65.22, 65.225, 65.235, 65.25, 65.285; 303/113.1, 115.1, 146, 151, 152, 2, 303/9.62; 475/150, 198, 204, 205, 216, 475/230, 249, 5; 477/29, 3; 701/22, 48, 69, 701/70, 71, 74, 89
See application file for complete search history.

(56) References Cited

U.S. PATENT DOCUMENTS 6,406,105 B1 *  6/2002  Shimada et al. ............... 303/152
7,322,659 B2 *  1/2008  Finch et al. .................... 303/152
(Continued)

FOREIGN PATENT DOCUMENTS

JP    A-2000-43696    2/2000
JP    A-2002-51404    2/2002
(Continued)

OTHER PUBLICATIONS

International Search Report issued in International Application No. PCT/JP2009/068037 dated Jan. 19, 2010 (with translation).

Primary Examiner — Fadey Jabr
Assistant Examiner — Kevin P Mahne
(74) Attorney, Agent, or Firm — Oliff PLC

(57) ABSTRACT

Provided is a drive control device for a standby four-wheel drive vehicle having primary drive wheels coupled to a drive source including a motor generator that generates a regenerative braking torque and a clutch device disposed between the drive source and secondary drive wheels to switch a two-wheel drive state using the primary drive wheels and a four-wheel drive state using the primary drive wheels and the secondary drive wheels, including: a transmission torque control portion that causes the clutch device to set a transmission torque between the drive source and the secondary drive wheels to zero so as to allow only the primary drive wheels to perform regenerative braking if a request braking torque of the vehicle is equal to or lower than a predetermined primary-drive-wheel regeneration limit torque during the regenerative braking by the motor generator, the transmission torque control portion causing the clutch device to generate the transmission torque between the drive source and the secondary drive wheels so as to allow the primary drive wheels and the secondary drive wheels to perform the regenerative braking if the request braking torque exceeds the primary-drive-wheel regeneration limit torque.

6 Claims, 8 Drawing Sheets

(56) References Cited

U.S. PATENT DOCUMENTS

| | | | |
|---|---|---|---|
| 7,441,845 B2* | 10/2008 | Crombez et al. | 303/152 |
| 7,472,766 B2 | 1/2009 | Yamamoto et al. | |
| 2002/0013194 A1* | 1/2002 | Kitano et al. | 477/3 |
| 2002/0030408 A1* | 3/2002 | Niwa et al. | 303/152 |
| 2002/0041167 A1 | 4/2002 | Kitano et al. | |
| 2003/0080614 A1* | 5/2003 | Soga | 303/152 |
| 2004/0070270 A1 | 4/2004 | Gunji | |
| 2004/0238244 A1* | 12/2004 | Amanuma et al. | 180/65.2 |
| 2005/0103551 A1* | 5/2005 | Matsuno | 180/243 |
| 2005/0104445 A1* | 5/2005 | Choi | 303/152 |
| 2005/0159871 A1* | 7/2005 | Nakamura et al. | 701/70 |
| 2006/0055239 A1* | 3/2006 | Crombez et al. | 303/152 |
| 2006/0055240 A1* | 3/2006 | Toyota et al. | 303/152 |
| 2006/0196712 A1* | 9/2006 | Toyota et al. | 180/165 |
| 2007/0018499 A1* | 1/2007 | Kokubo et al. | 303/151 |
| 2007/0029874 A1* | 2/2007 | Finch et al. | 303/152 |
| 2007/0034428 A1* | 2/2007 | Janson | 180/65.3 |
| 2007/0038340 A1* | 2/2007 | Sekiguchi et al. | 701/22 |
| 2007/0093341 A1* | 4/2007 | Supina et al. | 475/5 |
| 2008/0100129 A1* | 5/2008 | Lubbers | 303/113.1 |
| 2008/0153660 A1* | 6/2008 | Uejima et al. | 477/3 |
| 2008/0289894 A1* | 11/2008 | Muta et al. | 180/248 |
| 2009/0051216 A1* | 2/2009 | Maeda et al. | 303/146 |
| 2010/0127562 A1* | 5/2010 | Yokoyama et al. | 303/151 |
| 2010/0138117 A1* | 6/2010 | Witte | 701/48 |
| 2011/0031804 A1* | 2/2011 | Shimada et al. | 303/2 |

FOREIGN PATENT DOCUMENTS

| | | |
|---|---|---|
| JP | A-2004-135471 | 4/2004 |
| JP | A-2004-357375 | 12/2004 |
| JP | A-2005-145334 | 6/2005 |
| JP | A-2006-141150 | 6/2006 |
| JP | A-2006-327335 | 12/2006 |
| JP | A-2008-301564 | 12/2008 |

* cited by examiner

| FRONT/REAR WHEEL ROTATION SPEED CONDITION | PILOT CLUTCH TYPE | | CLUTCH DIRECT PRESSING TYPE | |
|---|---|---|---|---|
| | Tf | Tr | Tf | Tr |
| Nf > Nr | Tc | Tko-Tc | Tc | Tko-Tc |
| Nf = Nr | UNABLE TO TRANSMIT TORQUE | | | |
| Nf Lock Nr | | | Tko/2 | Tko/2 |
| Nf < Nr | | | UNABLE TO TRANSMIT TORQUE | |

DRIVE CONTROL DEVICE FOR STANDBY FOUR-WHEEL DRIVE VEHICLE

TECHNICAL FIELD

The present invention relates to a drive control device for a standby four-wheel drive vehicle, and, more particularly, to a technique of achieving a reduction in an amount of electric power consumed for operating a clutch device that switches a two-wheel drive state and a four-wheel drive state and an increase in a regenerative efficiency of a motor generator, thereby improving fuel economy.

BACKGROUND ART

A standby four-wheel drive vehicle is known that includes primary drive wheels coupled to a drive source including a motor generator that generates a regenerative braking torque, and a clutch device disposed between the drive source and secondary drive wheels to switch a two-wheel drive state using the primary drive wheels and a four-wheel drive state using the primary drive wheels and the secondary drive wheels. An example is a standby four-wheel drive vehicle of Patent Document 1, for example. In Patent Document 1, during regenerative braking by the motor generator, the clutch device is controlled such that the regenerative braking is performed with both the primary drive wheels and the secondary drive wheels. Performing the regenerative braking with both the primary drive wheels and the secondary drive wheels improves the behavioral stability of the vehicle.

PRIOR ART DOCUMENT

Patent Document

Patent Document 1: Japanese Laid-Open Patent Publication No.

SUMMARY OF THE INVENTION

Problems to Be Solved by the Invention

In the conventional standby four-wheel drive vehicle, as described above, since the clutch device is operated such that the regenerative braking is performed with both the primary drive wheels and the secondary drive wheels during the regenerative braking of the motor generator, an amount of electric power consumed for operating the clutch device is increased and this is a factor that prevents improvement in fuel economy. Since the four-wheel drive state using the primary drive wheels and the secondary drive wheels leads to a greater power transmission loss than the two-wheel drive state using the primary drive wheels, the regenerative efficiency of the motor generator is reduced by performing the regenerative braking with both the primary drive wheels and the secondary drive wheels and this is also a factor that prevents improvement in fuel economy.

The present invention was conceived in view of the situations and it is therefore an object of the present invention to provide a drive control device for a standby four-wheel drive vehicle that achieves a reduction in an amount of electric power consumed for operating a clutch device and an increase in a regenerative efficiency of a motor generator, thereby improving fuel economy.

Means for Solving the Problem

The object indicated above can be achieved according to a first mode of the present invention, which provides a drive control device for a standby four-wheel drive vehicle (1) having primary drive wheels coupled to a drive source including a motor generator that generates a regenerative braking torque and a clutch device disposed between the drive source and secondary drive wheels to switch a two-wheel drive state using the primary drive wheels and a four-wheel drive state using the primary drive wheels and the secondary drive wheels, comprising: (2) a transmission torque control means that causes the clutch device to set a transmission torque between the drive source and the secondary drive wheels to zero so as to allow only the primary drive wheels to perform regenerative braking if a request braking torque of the vehicle is equal to or lower than a predetermined primary-drive-wheel regeneration limit torque during the regenerative braking by the motor generator, the transmission torque control means causing the clutch device to generate the transmission torque between the drive source and the secondary drive wheels so as to allow the primary drive wheels and the secondary drive wheels to perform the regenerative braking if the request braking torque exceeds the primary-drive-wheel regeneration limit torque.

The object indicated above can be achieved according to a second mode of the present invention, which provides the drive control device for a standby four-wheel drive vehicle of the first mode of the present invention, wherein if the request braking torque exceeds the primary-drive-wheel regeneration limit torque, the transmission torque control means controls the transmission torque of the clutch device to adjust a regenerative braking torque of the secondary drive wheels such that a braking torque of the secondary drive wheels is set to a difference between the request braking torque and the primary-drive-wheel regeneration limit torque.

The object indicated above can be achieved according to a third mode of the present invention, which provides the drive control device for a standby four-wheel drive vehicle of the first mode of the present invention, wherein if the request braking torque exceeds the primary-drive-wheel regeneration limit torque, the transmission torque control means controls the transmission torque of the clutch device to adjust a regenerative braking torque of the secondary drive wheels such that a value acquired by subtracting a predetermined given correction value from a rotation speed of the secondary drive wheels becomes substantially equal to a rotation speed of the primary drive wheels.

The object indicated above can be achieved according to a fourth mode of the present invention, which provides the drive control device for a standby four-wheel drive vehicle of any one of the first to third modes of the present invention, wherein if a value acquired by subtracting a predetermined given differential rotation number correction value from the rotation speed of the secondary drive wheels is greater than the rotation speed of the primary drive wheels, the transmission torque control means increases the transmission torque of the clutch device to increase a regenerative braking torque of the secondary drive wheels.

The object indicated above can be achieved according to a fifth mode of the present invention, which provides the drive control device for a standby four-wheel drive vehicle of any one of the first to fourth modes of the present invention, wherein (1) the standby four-wheel drive vehicle includes a primary-drive-wheel hydraulic brake and a secondary-drive-wheel hydraulic brake that respectively generate braking torques for the primary drive wheels and the secondary drive wheels depending on supplied oil pressures, and wherein (2) a hydraulic brake control means is included that controls each of the primary-drive-wheel hydraulic brake and the secondary-drive-wheel hydraulic brake such that a distribution ratio of a braking torque of the primary drive wheels and a braking torque of the secondary drive wheels is controlled along a predetermined braking torque distribution line if the request braking torque exceeds a predetermined regeneration limit torque.

The object indicated above can be achieved according to a sixth mode of the present invention, which provides the drive control device for a standby four-wheel drive vehicle of the fourth or fifth mode of the present invention, wherein when the request braking torque exceeds the primary-drive-wheel regeneration limit torque, if a difference between the rotation speed of the secondary drive wheels and the rotation speed of the primary drive wheels is equal to or lower than the differential rotation number correction value, the transmission torque control means fixes the transmission torque of the clutch device to increase the regenerative braking torque of the primary drive wheels.

Effects of the Invention

According to the drive control device for a standby four-wheel drive vehicle of the first aspect of the invention, since the transmission torque control means is included that causes the clutch device to set the transmission torque between the drive source and the secondary drive wheels to zero so as to allow only the primary drive wheels to perform the regenerative braking if the request braking torque of the vehicle is equal to or lower than the predetermined primary-drive-wheel regeneration limit torque during the regenerative braking by the motor generator, the clutch device is not operated if the request braking torque of the vehicle is equal to or lower than the primary-drive-wheel regeneration limit torque and, therefore, an amount of electric power consumed for operating the clutch device is reduced as compared to the case of operating the clutch device such that the regenerative braking is performed with both the primary drive wheels and the secondary drive wheels during the regenerative braking by the motor generator, for example. In the two-wheel drive state when the regenerative braking is performed with the primary drive wheels, a power transmission loss is reduced as compared to the four-wheel drive state when the regenerative braking is performed with the primary drive wheels and the secondary drive wheels and, therefore, the regenerative efficiency of the motor generator is increased. As a result, the fuel economy of the vehicle is improved.

According to the drive control device for a standby four-wheel drive vehicle of the second aspect of the invention, if the request braking torque exceeds the primary-drive-wheel regeneration limit torque, the transmission torque control means controls the transmission torque of the clutch device to adjust the regenerative braking torque of the secondary drive wheels such that the braking torque of the secondary drive wheels is set to a difference between the request braking torque and the primary-drive-wheel regeneration limit torque; as a result, the braking torque of the secondary drive wheels is control to be a portion of the request braking torque exceeding the primary-drive-wheel regeneration limit torque that is the upper limit of the braking torque that may be exerted by the primary drive wheels during the regenerative control using only the primary drive wheels; and, therefore, an amount of electric power consumed by the clutch device for acquiring the braking torque of the secondary drive wheels is set to the required minimum value for acquiring the request braking torque, thereby improving the fuel economy of the vehicle.

According to the drive control device for a standby four-wheel drive vehicle of the third aspect of the invention, if the request braking torque exceeds the primary-drive-wheel regeneration limit torque, the transmission torque control means controls the transmission torque of the clutch device to adjust the regenerative braking torque of the secondary drive wheels such that a value acquired by subtracting a predetermined given correction value from the rotation speed of the secondary drive wheels becomes substantially equal to the rotation speed of the primary drive wheels; as a result, the transmission torque of the clutch device is increased as quickly as possible within a range satisfying the condition that enables the clutch device to transmit the regenerative braking torque, i.e., within a range where the value acquired by subtracting the given correction value from the rotation speed of the secondary drive wheels exceeds the rotation speed of the primary drive wheels; and, therefore, the regenerative braking torque of the secondary drive wheels is increased as quickly as possible, thereby making the regenerative braking of the secondary drive wheels effective as much as possible.

According to the drive control device for a standby four-wheel drive vehicle of the fourth aspect of the invention, if the value acquired by subtracting the predetermined given differential rotation number correction value from the rotation speed of the secondary drive wheels is greater than the rotation speed of the primary drive wheels, the transmission torque control means increases the transmission torque of the clutch device to increase the regenerative braking torque of the secondary drive wheels; and, as a result, for example, if the transmission torque of the clutch device is controlled by the pilot clutch portion included in the clutch device, the transmission torque control of the clutch device restrains the rotation speed of the secondary drive wheels from becoming equal to or lower than the rotation speed of the primary drive wheels, thereby restraining the clutch device from becoming unable to transmit a torque.

According to the drive control device for a standby four-wheel drive vehicle of the fifth aspect of the invention, the hydraulic brake control means is included that controls each of the primary-drive-wheel hydraulic brake and the secondary-drive-wheel hydraulic brake such that a distribution ratio of the braking torque of the primary drive wheels and the braking torque of the secondary drive wheels is controlled along a predetermined braking torque distribution line if the request braking torque exceeds the predetermined regeneration limit torque and, therefore, if the braking torque distribution line is set in advance such that, for example, the front wheels are locked (slipped on a road surface) earlier than the rear wheels, the rear wheels can be prevented from being locked earlier, thereby sufficiently ensuring the behavioral stability of the vehicle.

According to the drive control device for a standby four-wheel drive vehicle of the sixth aspect of the invention, when the request braking torque exceeds the primary-drive-wheel regeneration limit torque, if a difference between the rotation speed of the secondary drive wheels and the rotation speed of the primary drive wheels is equal to or lower than the differential rotation number correction value, the transmission torque control means fixes the transmission torque of the clutch device to increase the regenerative braking torque of the primary drive wheels and, as a result, the same regenerative amount is acquired as is the case with a full-time four-wheel drive vehicle, thereby increasing a regenerative amount to improve fuel economy.

MODES FOR CARRYING OUT THE INVENTION

Exemplary embodiments of the present invention will now be described in detail with reference to the drawings. In the following embodiments, the figures are simplified or deformed as needed and are not necessarily accurately drawn in terms of dimensional ratios, shapes, etc., of portions.

First Embodiment

Figure 1:
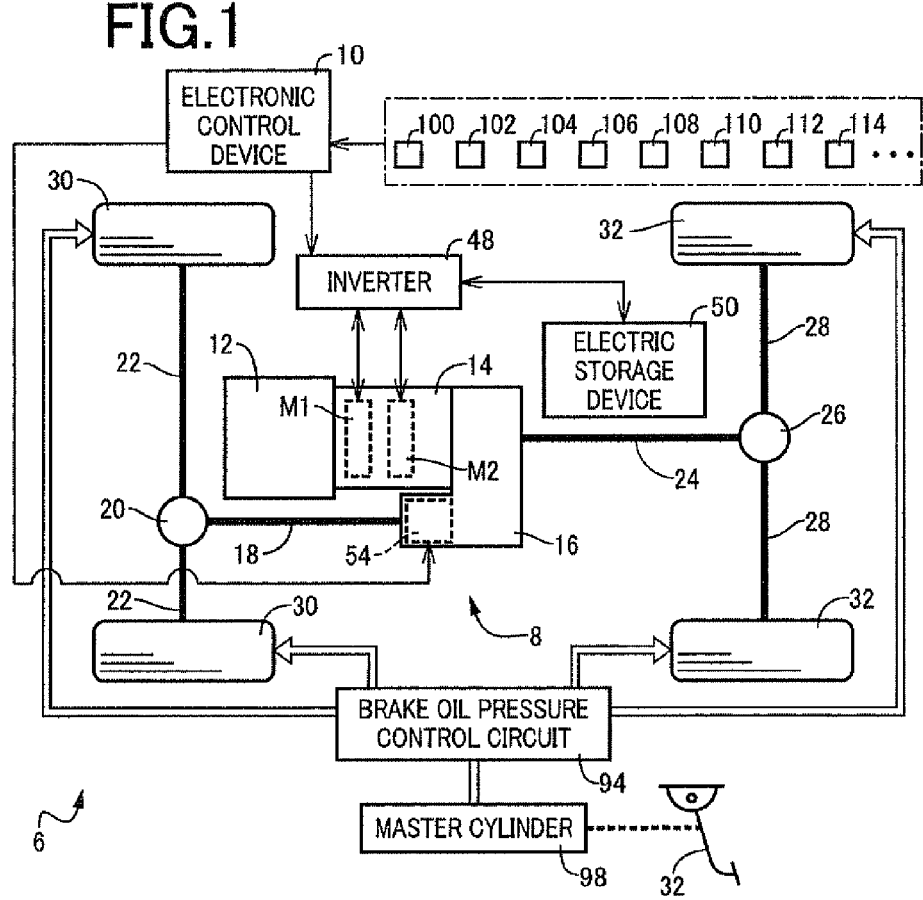
FIG. 1 is a diagram for explaining a vehicle driving device and an electronic control device for the control thereof disposed on a standby four-wheel drive vehicle according to one embodiment of the present invention.

FIG. 1 is a diagram for explaining a vehicle driving device 8 and an electronic control device 10 for the control thereof disposed on a standby four-wheel drive vehicle 6 according to one embodiment of the present invention. The electronic control device 10 corresponds to a drive control device of the present invention. The vehicle driving device 8 of this embodiment is preferably used in a hybrid vehicle that employs a standby 4WD system based on a front-engine rear-drive system (FR).

In FIG. 1, a drive force (drive torque) generated by an engine 12 is transmitted via a power transmission device 14 described later to a transfer 16. The drive force transmitted to the transfer 16 is distributed to a front propeller shaft 18 and a rear propeller shaft 24. The drive force transmitted to the front propeller shaft 18 is transmitted via a front-wheel differential gear device 20 and front-wheel axles 22 to a pair of left and right front-side drive wheels (front drive wheels) 30. On the other hand, the drive force transmitted to the rear propeller shaft 24 is transmitted via a rear-wheel differential gear device 26 and rear-wheel axles 28 to a pair of left and right rear-side drive wheels (rear drive wheels) 32. The front-wheel differential gear device 20 and the rear-wheel differential gear device 26 are of a well-known so-called bevel gear type and respectively rotationally drive the pairs of the left and right front-wheel axles 22 and rear-wheel axles 28 while allowing a rotational difference. The front-side drive wheels 30 and the rear-side drive wheels 32 correspond to secondary drive wheels and primary drive wheels of the present invention.

Figure 2:
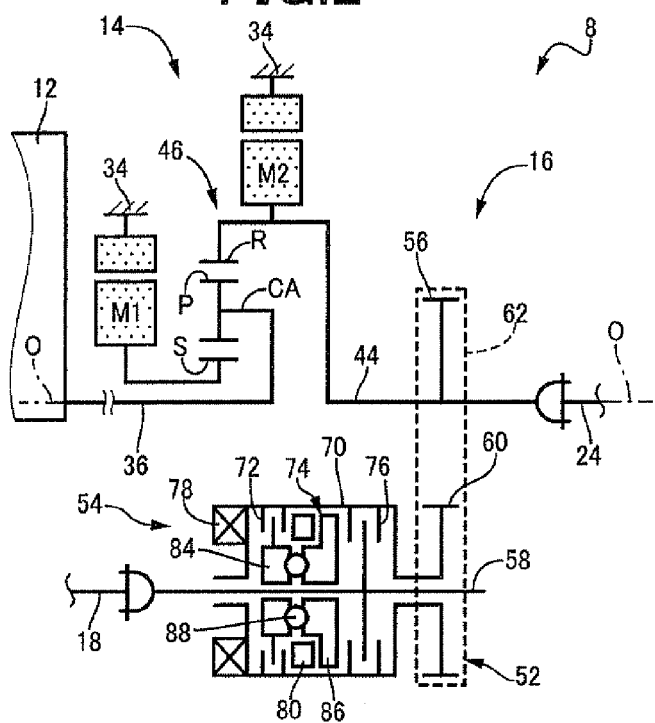
FIG. 2 is a schematic for explaining a configuration of the power transmission device and the transfer depicted in FIG. 1.

FIG. 2 is a schematic for explaining a configuration of the power transmission device 14 and the transfer 16 depicted in FIG. 1. In FIG. 2, the power transmission device 14 is disposed on a common shaft center O in a transmission case 34 and includes an input shaft 36 coupled to a crankshaft of the engine 12, a power distribution mechanism 46 coupled to the input shaft 36, a first motor generator M1 coupled to the power distribution mechanism 46 in a power transmittable manner to control a differential state of the power distribution mechanism 46, and a second motor generator M2 coupled to an output shaft 44 so as to rotate integrally with the output shaft 44. The power transmission device 14 of this embodiment functions as an electric stepless transmission that continuously varies a gear ratio γ0 (rotation speed $N_{IN}$ of the input shaft 36/rotation speed $N_{OUT}$ of the output shaft) that is a rotation number ratio of the output shaft 44 to the input shaft 36. The output shaft 44 is an output-side rotating member of the power transmission device 14 and also corresponds to an input-side rotating member of the transfer 16. The first motor generator M1 and the second motor generator M2 (hereinafter referred to as a motor generator M if not particularly distinguished) are controlled via an inverter 48 (see FIG. 1) by the electronic control device 10 and generate electric energy through regeneration to accumulate the electric energy into an electric storage device 50 (see FIG. 1), for example. The motor generator M corresponds to a motor generator that generates a regenerative braking torque in the present invention. The power transmission device 14 and a portion of the transfer 16 disposed on the shaft center O in series with the power transmission device 14 are configured symmetrically relative to the shaft center O and, therefore, the lower side thereof is not depicted in the schematic of FIG. 2.

When the power transmission device 14 configured as described above is put into a differential state where a differential action is achieved by enabling the rotating elements (a sun gear S, a ring gear R, and a carrier CA) of the power differential portion 46 to rotate relative to each other, the output of the engine 12 is distributed to the first motor generator M1 and the output shaft 44, and the electric energy generated by the first motor generator M1 from a portion of the distributed output of the engine 12 is accumulated and used for rotationally driving the second motor generator M2. When the rotation number of the first motor generator M1 is controlled and the rotation of the output shaft 44 is continuously varied regardless of a given rotation of the engine 12, the power transmission device 14 is put into a stepless shifting state to function as an electric stepless transmission with the gear ratio γ0 of the power distribution mechanism 46 continuously varied from a minimum value $γ0_{min}$ to a maximum value $γ0_{max}$.

In FIG. 2, the transfer 16 distributes the drive force output from the power transmission device 14 to the front propeller shaft 18 and the rear propeller shaft 24. The transfer 16 of this embodiment includes a transmitting device 52 for transmitting a torque between the output shaft 44 and the front propeller shaft 18, and a control coupling device 54 disposed between the output shaft 44 and the front propeller shaft 18 to limit the differential rotation thereof so as to control a front/rear drive force distribution. The control coupling device 54 corresponds to a clutch device of the present invention.

The transmitting device 52 includes a driving gear 56 coupled to the output shaft 44, a driven gear 60 disposed on the outer circumferential side of a rotation shaft 58 coupled to the front propeller shaft 18, concentrically with the rotation shaft 58 and in a relatively rotatable manner, and a transmitting belt 62 wrapped around the outer circumferential portions of the driving gear 56 and the driven gear 60 to transmit a drive torque between the driving gear 56 and the driven gear 60.

The control coupling device 54 selectively couples the driven gear 60 and the rotation shaft 58 to switch a two-wheel drive state using the rear-side drive wheels 32 and a four-wheel drive state using the front-side drive wheels 30 and the rear-side drive wheels 32. The control coupling device 54 of this embodiment is of a well-known so-called pilot clutch type and includes a pilot clutch portion 72, a cam portion 74, and a main clutch portion 76 within a cover member 70 coupled to the driven gear 60. The pilot clutch portion 72 is an electromagnetic clutch, and a wet multi-plate type friction clutch 82 is engaged when an armature 80 is attracted by an electric magnet 78 excited by the electronic control device 10 (see FIG. 1). In the cam portion 74, when relative rotation occurs between a first cam member 84 coupled to the cover member 70 due to the engagement of the friction clutch 82 and a second cam member 86 supported by the rotation shaft 58 in a relatively rotatable manner, a cam follower 88 disposed therebetween moves the first cam member 84 and the second cam member 86 in directions away from each other. The main clutch portion 76 is mainly configured by, a wet multi-plate type friction clutch and is pressed by the second cam member 86 to be in engagement when the second cam member 86 is moved in the direction away from the first cam member 84 and moved toward the main clutch portion 76. The control coupling device 54 has a torque capacity i.e., a control coupling torque Tc continuously controlled by controlling an excitation current Ie supplied to the electric magnet 78.

Figures 3, 4:
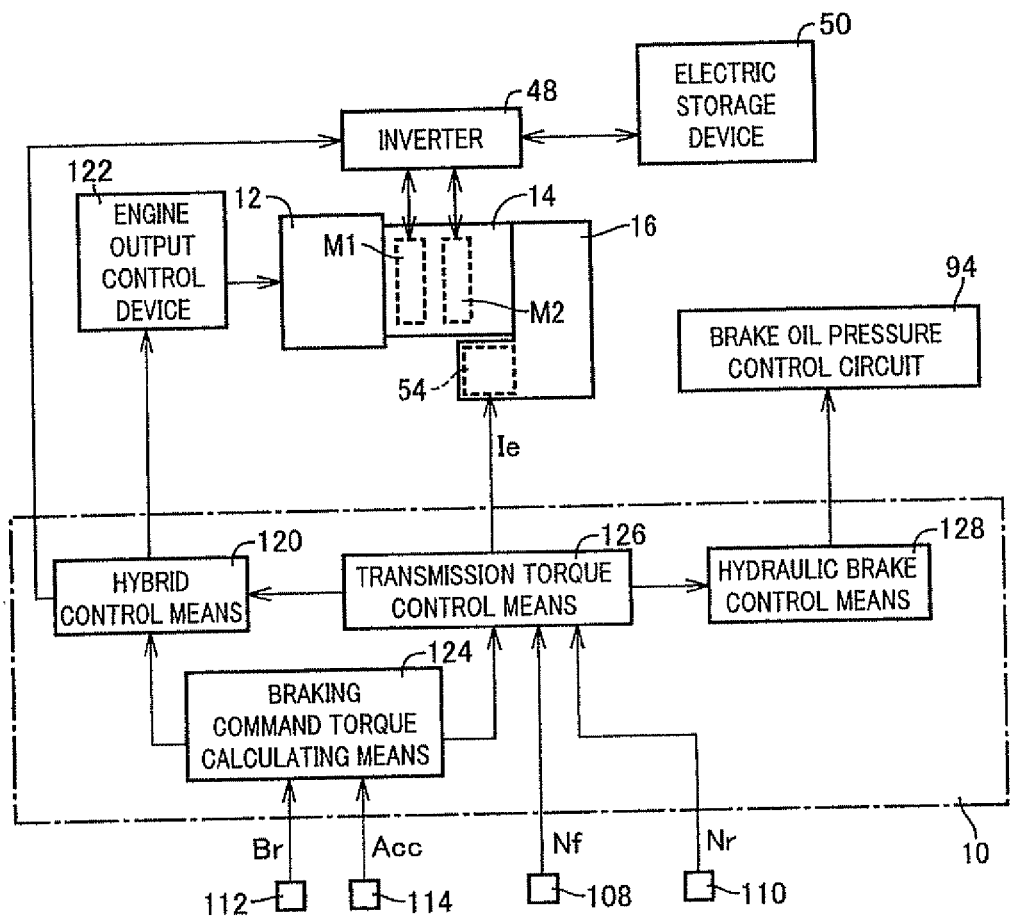
FIG. 3 is a diagram of relative rotation speed conditions of the front-side drive wheels and the rear-side drive wheels for enabling the control coupling device depicted in FIG. 2 to transmit a regenerative braking torque during regenerative braking by the motor generator depicted in FIG. 1.
FIG. 4 is a functional block line diagram for explaining a main portion of a control function included in the electronic control device depicted in FIG. 1.

FIG. 3 is a diagram of relative rotation speed conditions of the front-side drive wheels 30 and the rear-side drive wheels 32 for enabling the control coupling device 54 depicted in FIG. 2 to transmit a regenerative braking torque during regenerative braking by the motor generator M. As depicted in FIG. 3, in the case of the pilot clutch type as in this embodiment, the control coupling device 54 can transmit the regenerative braking torque when a rotation speed (hereinafter referred to as a front-wheel rotation speed) Nf of the front-side drive wheels 30 is greater than a rotation speed (hereinafter referred to as a rear-wheel rotation speed) Nr of the rear-side drive wheels 32. A regenerative braking torque (hereinafter referred to as a front-wheel regenerative braking torque) Tf of the front-side drive wheels 30 in this case is equal to the control coupling torque Tc, and a regenerative braking torque (hereinafter referred to as a rear-wheel regenerative braking torque) Tr of the rear-side drive wheels 32 is a difference between a regenerative braking command torque Tko to the motor generator M and the control coupling torque Tc. When the front-wheel rotation speed Nf is equal to or lower than the rear-wheel rotation speed Nr and when the main clutch portion is put into a complete engagement state, i.e., a locked state, the control coupling device 54 is unable to transmit the regenerative braking torque.

In the transfer 16 configured as described above, the output of the engine 12 and the motor generator M corresponding to a drive source of the present invention is distributed to the front propeller shaft 18 and the rear propeller shaft 24 depending on an operational state of the control coupling device 54. For example, when the control coupling device 54 is released, i.e., when the excitation current Ie is set to substantially zero, the output of the drive source is transmitted only to the rear propeller shaft 24. As a result, the standby four-wheel drive vehicle 6 is put into the two-wheel drive state using the rear-side drive wheels 32. For example, when the control coupling device 54 is completely engaged, i.e., when the excitation current Ie is set to a given value corresponding to the complete engagement, the output of the drive source is transmitted to the front propeller shaft 18 and the rear propeller shaft 24. As a result, the standby four-wheel drive vehicle 6 is put into the four-wheel drive state using the front-side drive wheels 30 and the rear-side drive wheels 32.

Returning to FIG. 1, the standby four-wheel drive vehicle 6 includes a rear-wheel hydraulic brake (primary-drive-wheel hydraulic brake) 90 and a front-wheel hydraulic brake (secondary-drive-wheel hydraulic brake) 92 that respectively generate braking torques for the front-side drive wheels 30 and the rear-side drive wheels 32 depending on supplied oil pressures, and a brake oil pressure control circuit 94 that supplies an oil pressure to each of the rear-wheel hydraulic brake 90 and the front-wheel hydraulic brake 92. The brake oil pressure control circuit 94 includes a hydraulic pump and an accumulator that generate an oil pressure for providing, for example, ABS control and VSC control, and an electromagnetic valve, for example, a linear solenoid valve that independently regulates an oil pressure supplied to each of the hydraulic brakes, so as to supply each of the hydraulic brakes with an oil pressure generated by a master cylinder 98 depending on a stepping force and a step-on speed of a brake pedal 96 due to a driver or an oil pressure generated by the hydraulic pump, in accordance with a command from the electronic control device 10, and so as to regulate and control the supplied oil pressures. The respective braking torques generated for the front-side drive wheels 30 and the rear-side drive wheels 32 by the front-wheel hydraulic brake 92 and the rear-wheel hydraulic brake 90 are increased and decreased depending on levels of the oil pressures respectively supplied from the brake oil pressure control circuit 94 to the front-wheel hydraulic brake 92 and the rear-wheel hydraulic brake 90.

In FIG. 1, the electronic control device 10 is for the purpose of providing control of operations of the vehicle driving device 8 and the brake oil pressure control circuit 94 and corresponds to a drive control device of the present invention. The electronic control device 10 includes a plurality of so-called microcomputers consisting of CPU, ROM, RAM, I/O interface, etc., and executes signal processes in accordance with programs stored in advance in the ROM, while utilizing a temporary storage function of the RAM, to provide various controls. The various controls include, for example, a hybrid drive control provided by calculating respective request outputs of the engine 12 and the motor generator M to give commands to the devices such that these request outputs can be acquired, an engine output control that provides control of the output of the engine in accordance with the commands, a motor generator output control that provides control of operation of the motor generator M as a drive force source or an electric generator in accordance with the commands, and a front/rear drive force distribution control that provides control of the control coupling torque Tc of the control coupling device 54 for controlling the front/rear drive force distribution.

The electronic control device 10 is supplied with various signals from sensors, switches, etc., disposed on the vehicle. For example, the electronic control device 10 is supplied with a signal indicative of an engine rotation speed $N_E$ from an engine rotation speed sensor 100, a signal indicative of a rotation speed $N_{OUT}$ of the output shaft 22 from a output-shaft rotation speed sensor 102, a signal indicative of a rotation speed $N_{M1}$ of the first motor generator M1 from a first-motor-generator rotation speed sensor 104, a signal indicative of a rotation speed $N_{M2}$ of the second motor generator M2 from a second-motor-generator rotation speed sensor 106, a signal indicative of the front-wheel rotation speed Nf from a front-wheel rotation speed sensor 108, a signal indicative of the rear-wheel rotation speed Nr from a rear-wheel rotation speed sensor 110, a signal indicative of an operation amount of the brake pedal 96, i.e., a brake pedal operation amount Br from a brake sensor 112, and a signal indicative of an opening degree of an accelerator pedal not shown, i.e., an accelerator opening degree Acc from an accelerator opening degree sensor 114.

The electronic control device 10 outputs various signals, for example, a command signal for output control of the engine 12, a command signal for controlling the operation of the motor generator M, a command signal for controlling the operation of the control coupling device 54, and a command signal for controlling the operation of the brake oil pressure control circuit 94.

FIG. 4 is a functional block line diagram for explaining a main portion of a control function included in the electronic control device 10. In FIG. 4, a hybrid control means 120 controls the operations of the engine 12 and the motor generator M based on the various signals supplied from the sensors and switches to the electronic control device 10. For example, while commanding an engine output control device 122 to operate the engine 12 in an efficient operation range, the hybrid control means 120 changes the drive force distribution between the engine 12 and the second motor generator M2 and the reaction force due to the electric generation by the first motor generator M1 to the optimum state to control the gear ratio γ0 of the power transmission device 14 acting as an electric stepless transmission.

A braking command torque calculating means 124 calculates a braking command torque To of the vehicle from a predetermined relationship based on the various signals supplied from the sensors and switches to the electronic control device 10. The braking command torque calculating means 124 functionally includes a braking command torque calculation start determining means that determines whether the brake pedal 96 is stepped on and whether the accelerator pedal is completely returned, based on the signals supplied from the brake sensor 112 and the accelerator opening degree sensor 114 to the electronic control device 10, and that starts the calculation of the braking command torque To if any one of the above determinations is affirmative. The braking command torque To corresponds to a request braking torque of the present invention. If the calculated braking command torque To is equal to or lower than a predetermined regeneration limit torque TL2, the hybrid control means 120 provides the regeneration control of the motor generator M by controlling the regenerative braking command torque Tko such that a regenerative braking torque acquired through the regeneration of the motor generator M becomes equal to the braking command torque To. If the braking command torque To exceeds the regeneration limit torque TL2, the hybrid control means 120 provides the regeneration control of the motor generator M by controlling the regenerative braking command torque Tko such that the regenerative braking torque acquired through the regeneration of the motor generator M becomes equal to the regeneration limit torque TL2. The regeneration limit torque TL2 is the upper limit of the regenerative braking torque determined by the upper limit of electric energy that can be accumulated in the electric storage device 50 through the regeneration of the motor generator M, for example, and is empirically obtained in advance.

A transmission torque control means 126 determines whether the braking command torque To calculated by the braking command torque calculating means 124 is equal to or lower than a predetermined rear-wheel regeneration limit torque (primary-drive-wheel regeneration limit torque) TL1 during regenerative braking by the motor generator M for generating a regenerative braking force. In this embodiment, the rear-wheel regeneration limit torque TL1 is a value empirically obtained and stored in advance as a limit value, i.e., the upper limit for stabilizing the behavior of the vehicle when the regenerative control is provided by using only the rear drive wheels 32 in the two-wheel drive state, for example.

If it is determined that the braking command torque To is equal to or lower than the rear-wheel regeneration limit torque TL1, the transmission torque control means 126 causes the control coupling device 54 to set the transmission torque between the drive source of the vehicle and the front-side drive wheels 30 to zero, allowing only the rear-side drive wheels 32 to perform the regenerative braking. Specifically, the control coupling torque Tc of the control coupling device 54 is set to zero. As a result, the regenerative braking torque of the rear-side drive wheels 32, i.e., a rear-wheel regenerative braking torque Tr is set to a value equal to the braking command torque To. In this case, a hydraulic braking command torque Tho is set to zero.

If it is determined that the braking command torque To is not equal to or lower than the rear-wheel regeneration limit torque TL1, the transmission torque control means 126 determines whether a value acquired by subtracting a predetermined given differential rotation number correction value k1 from the front-wheel rotation speed Nf exceeds the rear-wheel rotation speed Nr. The differential rotation number correction value k1 is empirically obtained in advance.

If it is determined that the value acquired by subtracting the differential rotation number correction value k1 from the front-wheel rotation speed Nf exceeds the rear-wheel rotation speed Nr, the transmission torque control means 126 causes the control coupling device 54 to generate the transmission torque between the drive source of the vehicle and the front-side drive wheels 30, allowing the rear-side drive wheels 32 and the front-side drive wheels 30 to perform the regenerative braking. In other words, the control coupling torque Tc of the control coupling device 54 is increased to increase the regenerative braking torque of the front-side drive wheels 30, i.e., the front-wheel regenerative braking torque Tf. Specifically, for example, the control coupling torque Tc of the control coupling 54 is controlled to adjust the front-wheel regenerative braking torque Tf such that the braking torque of the front-side drive wheels 30, i.e., a front-wheel braking torque TF is set to a difference between the braking command torque To and the rear-wheel regeneration limit torque TL1. As a result, the rear-wheel regenerative braking torque Tr is set to a value equal to the rear-wheel regeneration limit torque TL1. In this case, the hybrid control means 120 controls the regenerative braking command torque Tko such that the regenerative braking torque acquired through the regeneration of the motor generator M becomes equal to a sum of the rear-wheel regeneration limit torque TL1 and the control coupling torque Tc.

If it is determined that the value acquired by subtracting the differential rotation number correction value k1 from the front-wheel rotation speed Nf does not exceed the rear-wheel rotation speed Nr, the transmission torque control means 126 determines whether at least one of the front-side drive wheels 30 and the rear-side drive wheels 32 is locked, i.e., whether slippage occurs, based on comparison of the rotation speed $N_{OUT}$ of the output shaft 44 with the front-wheel rotation speed Nf and the rear-wheel rotation speed Nr, for example.

If it is determined that at least one of the front-side drive wheels 30 and the rear-side drive wheels 32 is locked, the transmission torque control means 126 output respective commands to cause the hybrid control means 120 to terminate the regenerative control and to cause a hydraulic brake control means 128 to provide well-known so-called ABS control.

If it is determined that neither the front-side drive wheels 30 nor the rear-side drive wheels 32 are locked, the transmission torque control means 126 sets the control coupling torque Tc of the control coupling device 54 to zero so as to terminate the regenerative braking using the front-side drive wheels 30. In this case, the hybrid control means 120 controls the regenerative braking command torque Tko such that the regenerative braking torque acquired through the regeneration of the motor generator M becomes equal to the rear-wheel regeneration limit torque TL1.

If it is determined that neither the front-side drive wheels 30 nor the rear-side drive wheels 32 are locked, the hydraulic brake control means 128 controls the front-wheel hydraulic brake 92 so as to compensate the front-wheel braking torque TF reduced by setting the control coupling torque Tc to zero. Specifically, for example, the hydraulic brake control means 128 controls an oil pressure supplied from the brake oil pressure control circuit 94 to the front-wheel hydraulic brake 92 such that a braking torque due to the front-wheel hydraulic brake 92, i.e., a front-wheel hydraulic braking torque Thf becomes equal to a difference between the braking command torque To and the rear-wheel regeneration limit torque TL1. As a result, the front-wheel regenerative braking torque Tf generated immediately before setting the control coupling torque Tc to zero is replaced with the front-wheel hydraulic braking torque Thf.

After it is determined that the value acquired by subtracting the differential rotation number correction value k1 from the front-wheel rotation speed Nf exceeds the rear-wheel rotation speed Nr, and the control coupling torque Tc of the control coupling 54 is controlled to adjust the front-wheel regenerative braking torque Tf, the transmission torque control means 126 determines whether the regenerative braking command torque Tko of the hybrid control means 120 exceeds the predetermined regeneration limit torque TL2.

Figure 6:
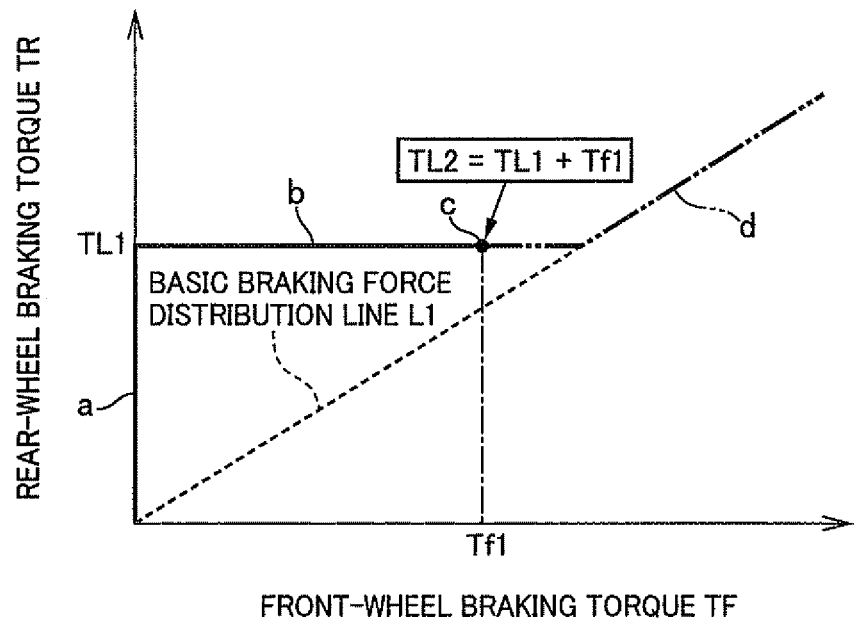
FIG. 6 is a diagram of values of the front-wheel braking torque and the rear-wheel braking torque varied because the control coupling device, the front-wheel hydraulic brake, and the rear-wheel hydraulic brake is controlled by the control operation of the electronic control device in accordance with the flowchart of FIG. 5, along with the predetermined basic braking force distribution line.

If it is determined that the regenerative braking command torque Tko exceeds the regeneration limit torque TL2, the hydraulic brake control means 128 controls each of the front-wheel hydraulic brake 92 and the rear-wheel hydraulic brake 90 such that a distribution ratio Rd of the front-wheel braking torque TF and a rear-wheel braking torque TR is controlled along a predetermined basic braking torque distribution line L1 as depicted in FIG. 6 described later. In this case, the hydraulic braking command torque Tho is set to a difference between the braking command torque To and the regeneration limit torque TL2. The braking command torque To is set to a sum of the hydraulic braking command torque Tho and the regenerative braking command torque Tko. The basic braking torque distribution line L1 is formed from sequentially arranged distribution points of the front-wheel braking torque TF and the rear-wheel braking torque TR, at which the front-side drive wheels 30 are locked (slipped) earlier than the rear-side drive wheels 32, within two-dimensional coordinates using the front-wheel braking torque TF and the rear-wheel braking torque TR as parameters, and is empirically obtained in advance. For example, as depicted in FIG. 6, when the rear-wheel braking torque TR is TL1 and the front-wheel braking torque TF is Tf1, if it is determined that the regenerative braking command torque Tko exceeds the regeneration limit torque TL2, the front-wheel hydraulic braking torque Thf of the front-wheel hydraulic brake 92 is controlled such that the distribution ratio Rd reaches the basic braking torque distribution line L1. When the distribution ratio Rd reaches the basic braking torque distribution line L1, each of the front-wheel hydraulic braking torque Thf of the front-wheel hydraulic brake 92 and a rear-wheel hydraulic braking torque Thr of the rear-wheel hydraulic brake 90 is controlled such that the distribution ratio Rd moves along the basic braking torque distribution line.

After the hydraulic braking torque control of the hydraulic brake control means 128 is provided, the transmission torque control means 126 determines whether at least one of the front-side drive wheels 30 and the rear-side drive wheels 32 is locked, i.e., whether slippage occurs.

If it is determined that at least one of the front-side drive wheels 30 and the rear-side drive wheels 32 is locked, the transmission torque control means 126 outputs respective commands to cause the hybrid control means 120 to terminate the regenerative control and to cause the hydraulic brake control means 128 to provide well-known so-called ABS control.

Figure 5:
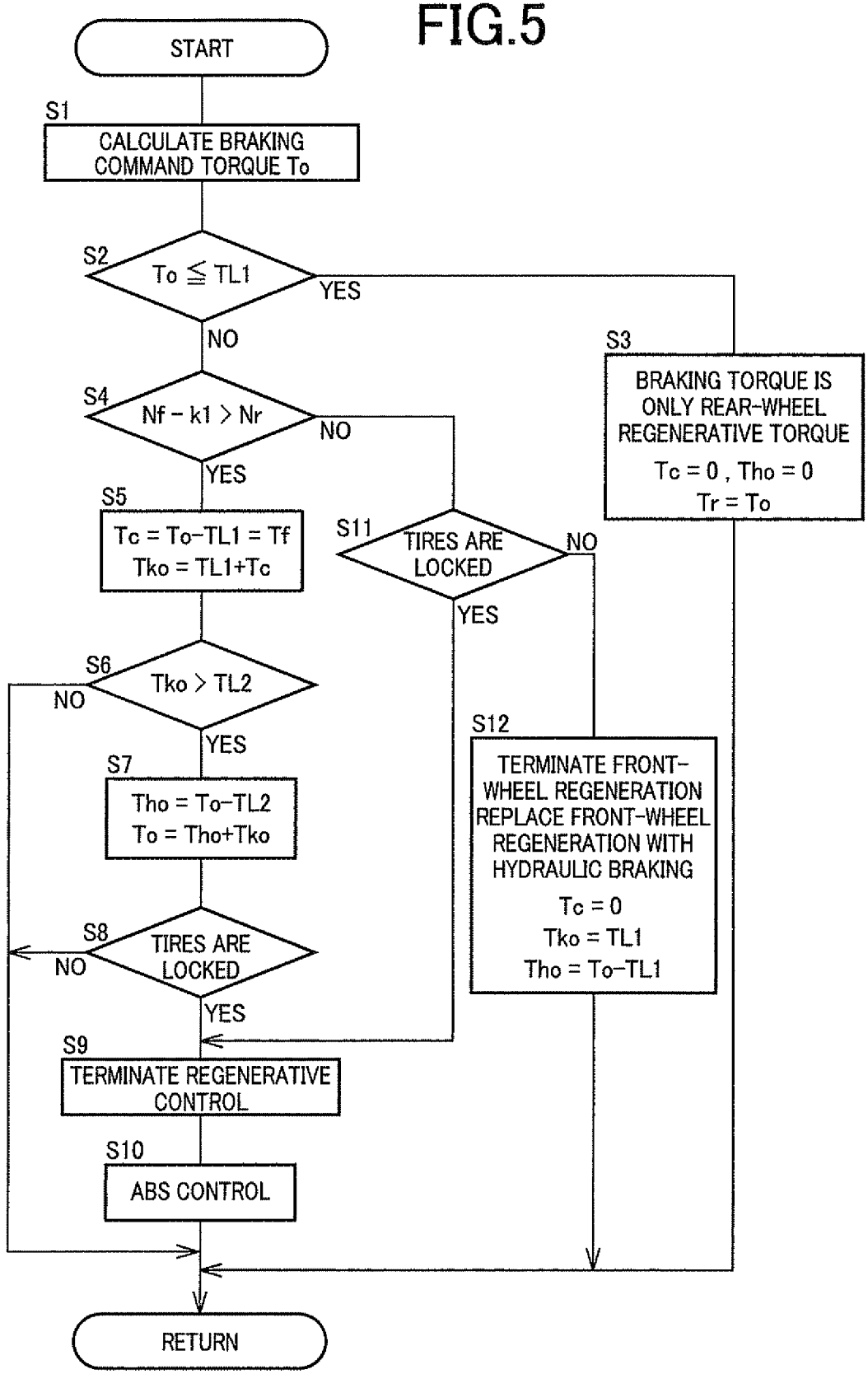
FIG. 5 is a flowchart for explaining a main portion of the control operation of the electronic control device, i.e. depicted in FIG. 1, a control operation for calculating the braking command torque To of the vehicle and operating the control coupling device or the brake oil pressure control circuit so as to acquire the braking command torque.

FIG. 5 is a flowchart for explaining a main portion of the control operation of the electronic control device 10, i.e., a control operation for calculating the braking command torque To of the vehicle and operating the control coupling device 54 or the brake oil pressure control circuit 94 so as to acquire the braking command torque To. This flowchart is repeatedly executed with an extremely short cycle time, for example, on the order of few msec to a few tens of msec, if one determination is affirmative between whether the brake pedal 96 is stepped on and whether the accelerator pedal is completely returned, based on the signals supplied from the brake sensor 112 and the accelerator opening degree sensor 114 to the electronic control device 10, for example.

In FIG. 5, first, at step (hereinafter, "step" will be omitted) S1 corresponding to the braking command torque calculating means 124, the braking command torque To of the vehicle is calculated from a predetermined relationship based on the various signals supplied from the sensors and switches to the electronic control device 10.

Subsequently, at S2 corresponding to the transmission torque control means 126, it is determined whether the braking command torque To calculated at S1 is equal to or lower than the predetermined rear-wheel regeneration limit torque TL1.

If the determination at S2 is affirmative, the control coupling torque Tc of the control coupling device 54 is set to zero at S3 corresponding to the transmission torque control means 126, and this routine is terminated. In this case, the regenerative braking is performed with only the rear-side drive wheels 32. The rear-wheel braking torque TR is set to a value equal to the braking command torque To and the hydraulic braking command torque Tho is set to zero.

FIG. 6 is a diagram of values of the front-wheel braking torque TF and the rear-wheel braking torque TR continuously varied because each of the control coupling device 54, the front-wheel hydraulic brake 92, and the rear-wheel hydraulic brake 90 is controlled by the control operation of the electronic control device 10 in accordance with the flowchart of FIG. 5, along with the predetermined basic braking force distribution line L1. As depicted in FIG. 6, when the determination at S2 of FIG. 5 is affirmative and S3 is repeatedly executed, the rear-wheel braking torque TR is increased and decreased along a solid line a of FIG. 6.

Returning to FIG. 5, if the determination at S2 is negative, it is determined at S4 corresponding to the transmission torque control means 126 whether a value acquired by subtracting the predetermined differential rotation number correction value k1 from the front-wheel rotation speed Nf exceeds the rear-wheel rotation speed Nr.

If the determination at S4 is affirmative, at S5 corresponding to the transmission torque control means 126, the transmission torque is generated by the control coupling device 54 between the drive source of the vehicle and the front-side drive wheels 30, and the regenerative braking is performed with the rear-side drive wheels 32 and the front-side drive wheels 30. Specifically, for example, the control coupling torque Tc of the control coupling 54 is controlled to adjust the front-wheel regenerative braking torque Tf such that the braking torque of the front-side drive wheels 30, i.e., the front-wheel braking torque TF is set to a difference between the braking command torque To and the rear-wheel regeneration limit torque TL1. In this case, the control coupling torque Tc is set to a value equal to the front-wheel braking torque TF and the regenerative braking command torque Tko is set to a value equal to a sum of the rear-wheel regeneration limit torque TL1 and the control coupling torque Tc. Repeated execution of S5 increases and decreases the front-wheel braking torque TF along a solid line b of FIG. 6.

Returning to FIG. 5, subsequently to S5, at S6 corresponding to the transmission torque control means 126, it is determined whether the regenerative braking command torque Tko exceeds the predetermined regeneration limit torque TL2. In FIG. 6, for example, since a sum of the rear-wheel regeneration limit torque TL1 and a front-wheel braking torque Tf1 exceeds the regeneration limit torque TL2 at a point c where the rear-wheel braking torque TR is the rear-wheel regeneration limit torque TL1 and the front-wheel braking torque TF is Tf1, the determination at S6 is affirmative.

If the determination at S6 is affirmative, at S7 corresponding to the hydraulic brake control means 128, each of the front-wheel hydraulic braking torque Thf of the front-wheel hydraulic brake 92 and the rear-wheel hydraulic braking torque Thr of the rear-wheel hydraulic brake 90 is controlled such that the distribution ratio Rd of the front-wheel braking torque TF and the rear-wheel braking torque TR is controlled along the predetermined basic braking torque distribution line L1 as depicted in FIG. 6. In this case, the hydraulic braking command torque Tho is set to a difference between the braking command torque To and the regeneration limit torque TL2, and the braking command torque To is set to a sum of the hydraulic braking command torque Tho and the regenerative braking command torque Tko. Repeated execution of S7 increases and decreases the front-wheel braking torque TF and the rear-wheel braking torque TR along a dashed-two dotted line d of FIG. 6.

Returning to FIG. 5, if the determination at S6 is negative and after S7 is executed, it is determined at S8 corresponding to the transmission torque control means 126 whether at least one of the front-side drive wheels 30 and the rear-side drive wheels 32 is locked, i.e., whether slippage occurs, based on comparison of the rotation speed $N_{OUT}$ of the output shaft 44 with the front-wheel rotation speed Nf and the rear-wheel rotation speed Nr, for example.

If the determination at S8 is negative, this routine is terminated. If the determination at S8 is affirmative, a command is output to terminate the regenerative control of the motor generator M at S9 corresponding to the transmission torque control means 126; a command is output to cause the brake oil pressure control circuit 94 to provide well-known so-called ABS control at S9 corresponding to the transmission torque control means 126; and this routine is terminated.

If the determination at S4 is negative, it is determined at S11 corresponding to the transmission torque control means 126 whether at least one of the front-side drive wheels 30 and the rear-side drive wheels 32 is locked, i.e., whether slippage occurs.

If the determination at S11 is affirmative, S9 and later are executed. If the determination at S11 is negative, the control coupling torque Tc of the control coupling device 54 is set to zero so as to terminate the regenerative braking using the front-side drive wheels 30 at S12 corresponding to the transmission torque control means 126 and the hydraulic brake control means 128. To compensate the front-wheel braking torque TF reduced by setting the control coupling torque Tc to zero, for example, an oil pressure supplied from the brake oil pressure control circuit 94 to the front-wheel hydraulic brake 92 is controlled such that a braking torque due to the front-wheel hydraulic brake 92, i.e., the front-wheel hydraulic braking torque Thf becomes equal to a difference between the braking command torque To and the rear-wheel regeneration limit torque TL1. In this case, the regenerative braking command torque Tko is controlled to be equal to the rear-wheel regeneration limit torque TL1.

According to the electronic control device (drive control device) 10 for a standby four-wheel drive vehicle 6 of the present embodiment, since the transmission torque control means 126 is included that causes the control coupling device (clutch device) 54 to set the transmission torque between the drive source and the front-side drive wheels 30 to zero so as to allow only the rear-side drive wheels 32 to perform the regenerative braking if the braking command torque (request braking torque) To that is calculated by the braking command torque calculating means 124 is equal to or lower than the predetermined primary-drive-wheel regeneration limit torque TL1 during the regenerative braking by the motor generator M, the control coupling device 54 is not operated if the braking command torque To of the vehicle is equal to or lower than the primary-drive-wheel regeneration limit torque TL1 and, therefore, an amount of electric power consumed for operating the control coupling device 54 is reduced as compared to the case of operating the control coupling device 54 such that the regenerative braking is performed with both the rear-side drive wheels 32 and the front-side drive wheels 30 during the regenerative braking by the motor generator M, for example. In the two-wheel drive state when the regenerative braking is performed with the rear-side drive wheels 32, a power transmission loss is reduced as compared to the four-wheel drive state when the regenerative braking is performed with the rear-side drive wheels 32 and the front-side drive wheels 30 and, therefore, the regenerative efficiency of the motor generator M is increased. As a result, the fuel economy of the vehicle is improved.

According to the electronic control device 10 for a standby four-wheel drive vehicle 6 of the present embodiment, if the braking command torque To exceeds the primary-drive-wheel regeneration limit torque TL1, the transmission torque control means 126 controls the control coupling torque (transmission torque) Tc of the control coupling device 54 to adjust the front-wheel braking torque TF such that the braking torque of the front-side drive wheels 30 is set to a difference between the braking command torque To and the primary-drive-wheel regeneration limit torque TL1; as a result, the front-wheel braking torque TF is control to be a portion of the braking command torque To exceeding the primary-drive-wheel regeneration limit torque TL1; and, therefore, an amount of electric power consumed by the control coupling device 54 for acquiring the front-wheel braking torque TF is set to the required minimum value for acquiring the braking command torque To, thereby improving the fuel economy of the vehicle.

According to the electronic control device 10 for a standby four-wheel drive vehicle 6 of the present embodiment, if the value acquired by subtracting the predetermined given differential rotation number correction value k1 from the front-wheel rotation speed Nf is greater than the rear-wheel rotation speed Nr, the transmission torque control means 126 increases the control coupling torque Tc of the control coupling device 54 to increase the front-wheel regenerative braking torque Tf; and, as a result, the transmission torque control of the control coupling device 54 restrains the front-wheel rotation speed Nf from becoming equal to or lower than the rear-wheel rotation speed Nr, thereby restraining the control coupling device 54 from becoming unable to transmit a torque.

According to the electronic control device 10 for a standby four-wheel drive vehicle 6 of the present embodiment, the hydraulic brake control means 128 is included that controls each of the rear-wheel hydraulic brake 90 and the front-wheel hydraulic brake 92 such that a distribution ratio Rd of the front-wheel braking torque TR and the front-wheel braking torque TF is controlled along a predetermined basic braking torque distribution line L1 if the braking command torque To exceeds the predetermined regeneration limit torque TL2 and, therefore, if the basic braking torque distribution line L1 is set such that, the front wheels are locked (slipped) earlier than the rear wheels, the rear wheels can be prevented from being locked earlier, thereby sufficiently ensuring the behavioral stability of the vehicle.

Figure 7:
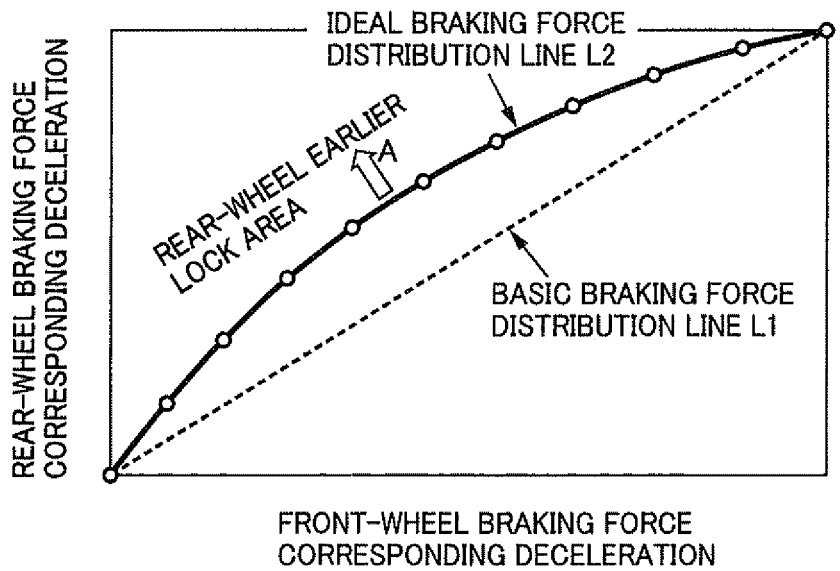
FIG. 7 is a diagram of an ideal braking force distribution line and the basic braking force distribution line within two-dimensional coordinates of an axis of rear-wheel braking force corresponding deceleration and an axis of front-wheel braking force corresponding deceleration.

FIG. 7 is a diagram of an ideal braking force distribution line L2 and the basic braking force distribution line L1 within two-dimensional coordinates of an axis of rear-wheel braking force corresponding deceleration and an axis of front-wheel braking force corresponding deceleration. In FIG. 7, the ideal braking force distribution line L2 indicated by a solid line is formed from sequentially arranged distribution points, at which the front-side drive wheels 30 and the rear-side drive wheels 32 are locked at the same time when the front-side drive wheels 30 and the rear-side drive wheels 32 are caused to generate a braking force, within the two-dimensional coordinates. Therefore, as indicated by an arrow A, an area of the greater rear-wheel braking force corresponding deceleration or the smaller front-wheel braking force corresponding deceleration as compared to the ideal braking force distribution line L2 is an area where the rear-side drive wheels 32 are locked earlier than the front-side drive wheels 30, i.e., a rear-side drive wheel earlier lock area. On the other hand, the basic braking force distribution line L1 indicated by a dashed line is set within an area that is not the rear-side drive wheel earlier lock area, i.e., an area where front-side drive wheels 30 are locked earlier. Therefore, as described above, since the hydraulic brake control means 128 controls the distribution ratio Rd of the rear-wheel braking torque TR and the front-wheel braking torque TF along the basic braking torque distribution line L1 equivalent to the basic braking force distribution line L1 of FIG. 7, one of the front-side drive wheels 30 and the rear-side drive wheels 32 is prevented from being locked earlier than the other.

Second Embodiment

Another embodiment of the present invention will be described. In the following description of the embodiment, the portions overlapped with the embodiment described above will be denoted by the same reference numerals and will not be described.

Figure 9:
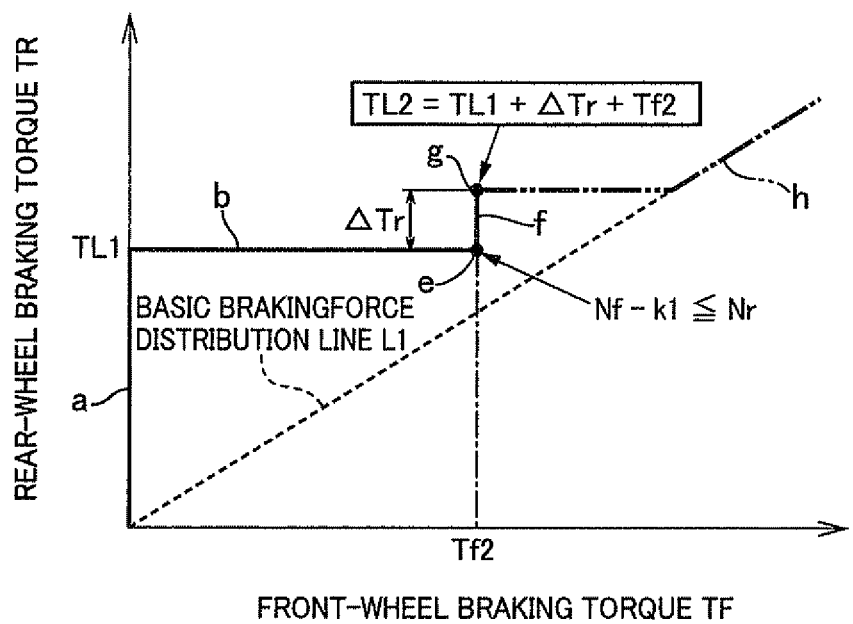
FIG. 9 is a diagram of values of the front-wheel braking torque and the rear-wheel braking torque continuously varied because of the control operation of the electronic control device in accordance with the flowchart of FIG. 8, along with the predetermined basic braking force distribution line.

In FIG. 4, when determining whether the value acquired by subtracting the predetermined differential rotation number correction value k1 from the front-wheel rotation speed Nf exceeds the rear-wheel rotation speed Nr, if the determination is negative, the transmission torque control means 126 of this embodiment fixes the control coupling torque Tc of the control coupling device 54 to a value when the above determination is affirmative so as to increase the rear-wheel regenerative braking torque Tr. When the determination is negative and control coupling torque Tc is fixed to a given value, the transmission torque control means 126 determines whether the regenerative braking command torque Tko exceeds the regeneration limit torque TL2. If the determination is negative, the rear-wheel regenerative braking torque Tr is increased as described above. If the determination is affirmative, the hydraulic brake control means 128 controls each of the front-wheel hydraulic brake 92 and the rear-wheel hydraulic brake 90 such that the distribution ratio Rd of the front-wheel braking torque TF and the rear-wheel braking torque TR is controlled along the predetermined basic braking torque distribution line L1 as depicted in FIG. 9 described later.

After the hydraulic braking torque control of the hydraulic brake control means 128 is provided as in the first embodiment as well as after the rear-wheel regenerative braking torque Tr is increased by fixing the control coupling torque Tc of the control coupling device 54 to a given value, the transmission torque control means 126 determines whether at least one of the front-side drive wheels 30 and the rear-side drive wheels 32 is locked, i.e., whether slippage occurs.

If it is determined that neither the front-side drive wheels 30 nor the rear-side drive wheels 32 are locked, the transmission torque control means 126 determines whether a value acquired by subtracting a predetermined correction value k2 from the front-wheel rotation speed Nf exceeds the rear-wheel rotation speed Nr. The value acquired by subtracting the predetermined correction value k2 from the front-wheel rotation speed Nf is a threshold value for determining whether the regenerative braking control using the front-side drive wheels 30 is continued, and the predetermined correction value k2 is set to a value smaller than the differential rotation number correction value k1. If the threshold value, i.e., the value acquired by subtracting the predetermined correction value k2 from the front-wheel rotation speed Nf, exceeds the rear-wheel rotation speed Nr, the transmission torque control means 126 continues the regenerative braking using the front-side drive wheels 30.

If it is determined that the value acquired by subtracting the predetermined correction value k2 from the front-wheel rotation speed Nf does not exceed the rear-wheel rotation speed Nr, the transmission torque control means 126 causes the control coupling device 54 to set the transmission torque between the drive source of the vehicle and the front-side drive wheels 30 to zero, i.e., to set the control coupling torque Tc to zero, allowing only the rear-side drive wheels 32 to perform the regenerative braking. In this case, the hybrid control means 120 sets the regenerative braking command torque Tko to the value equal to the rear-wheel regeneration limit torque TL1. The hydraulic brake control means 128 complements the front-wheel braking torque TF reduced by setting the control coupling torque Tc to zero with the front-wheel hydraulic braking torque Thf and complements the rear-wheel braking torque TR reduced by setting the rear-wheel regenerative braking torque Tr to the rear-wheel regeneration limit torque TL1 with the rear-wheel hydraulic braking torque Thr.

Figure 8:
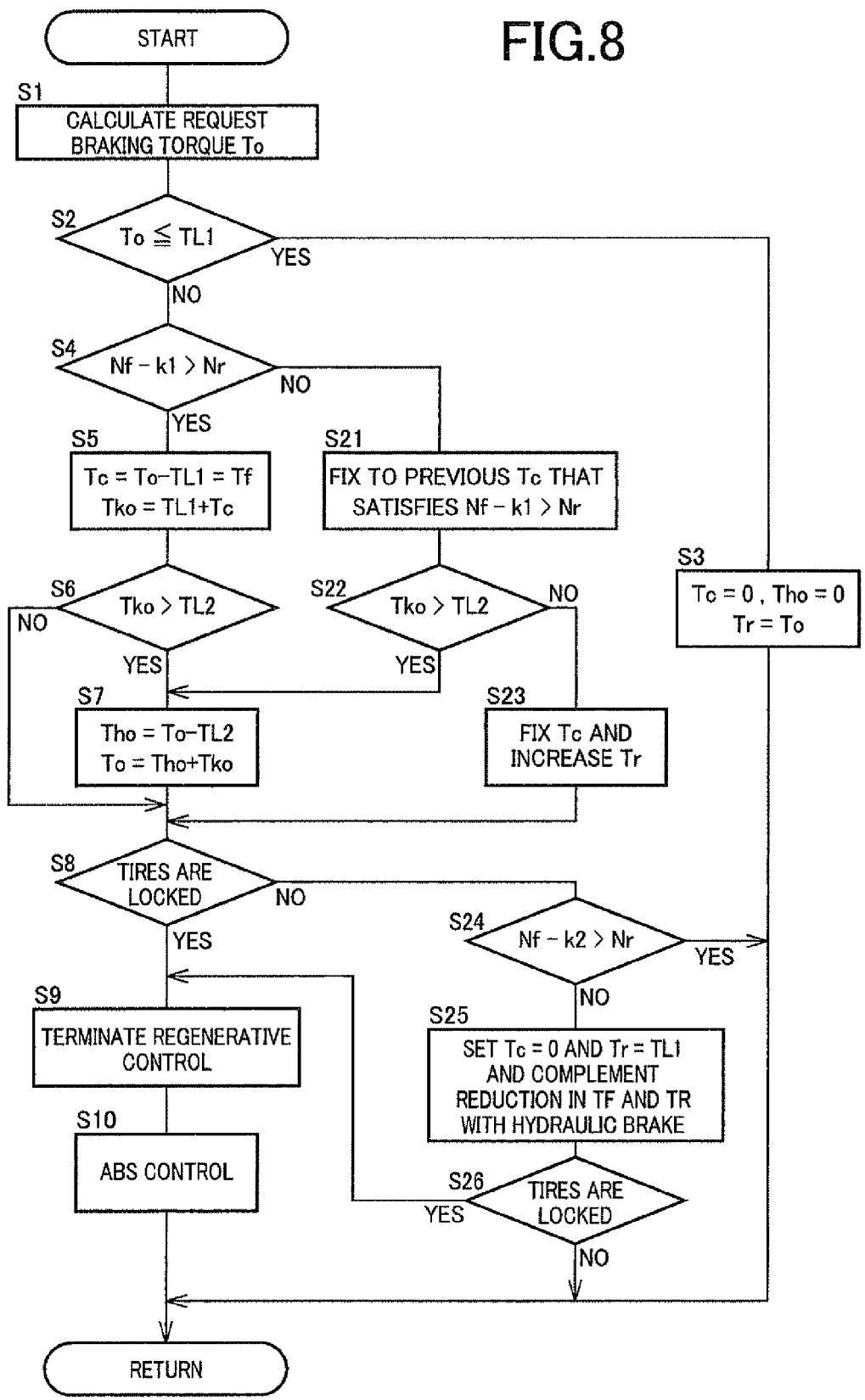
FIG. 8 is a flowchart for explaining a main portion of the control operation of the electronic control device of another embodiment of the present invention.

FIG. 8 is a flowchart for explaining a main portion of the control operation of the electronic control device 10 of this embodiment, corresponding to FIG. 5 of the first embodiment. As is the case with the first embodiment, this flowchart is repeatedly executed with an extremely short cycle time, for example, on the order of few msec to a few tens of msec, if one determination is affirmative between whether the brake pedal 96 is stepped on and whether the accelerator pedal is completely returned.

In FIG. 8, if the determination at S4 is negative, at S21 corresponding to the transmission torque control means 126, the control coupling torque Tc of the control coupling device 54 is fixed to the previous value when the determination at S4 was affirmative.

FIG. 9 is a diagram of values of the front-wheel braking torque TF and the rear-wheel braking torque TR continuously varied because each of the control coupling device 54, the front-wheel hydraulic brake 92, and the rear-wheel hydraulic brake 90 is controlled by the control operation of the electronic control device 10 in accordance with the flowchart of FIG. 8, along with the predetermined basic braking force distribution line L1. In FIG. 9, for example, when the determination at S4 of FIG. 8 is negative at a point e, the control coupling torque Tc of the control coupling device 54 is fixed to a front-wheel braking torque Tf2.

Returning to FIG. 8, after S21, it is determined at S22 corresponding to the transmission torque control means 126 whether the regenerative braking command torque Tko exceeds the predetermined regeneration limit torque TL2.

If the determination at S22 is affirmative, S7 and later are executed.

If the determination at S22 is negative, at S23 corresponding to the transmission torque control means 126 and the hybrid control means 120, the regenerative braking torque is increased while the control coupling torque Tc is fixed, so as to increase the rear-wheel regenerative braking torque Tr while the front-wheel regenerative braking torque Tf is fixed to Tf2. Repeated execution of S23 increases and decreases the rear-wheel braking torque TR along a solid line f of FIG. 9. In FIG. 9, for example, since a sum of the rear-wheel regeneration limit torque TL1, an incremental value ΔTr, and the front-wheel braking torque Tf2 exceeds the regeneration limit torque TL2 at a point g where the rear-wheel braking torque TR is a sum of the rear-wheel regeneration limit torque TL1 and the incremental value ΔTr and the front-wheel braking torque Tf2 is the front-wheel braking torque Tf2, the determination at S6 is affirmative. Repeated execution of S7 of FIG. 8 increases and decreases the front-wheel braking torque TF and the rear-wheel braking torque TR along a dashed-two dotted line h of FIG. 9.

Returning to FIG. 8, if the determination at S8 is negative, it is determined at S24 corresponding to the transmission torque control means 126 whether the value acquired by subtracting the predetermined correction value k2 from the front-wheel rotation speed Nf exceeds the rear-wheel rotation speed Nr.

If the determination at S24 is affirmative, this routine is terminated, and if the determination is negative, the control coupling torque Tc of the control coupling device 54 is set to zero at S25 corresponding to the transmission torque control means 126, the hybrid control means 120, and the hydraulic brake control means 128. The regenerative braking torque Tko is set to the value equal to the rear-wheel regeneration limit torque TL1. The front-wheel braking torque TF reduced by setting the control coupling torque Tc to zero is complemented with the front-wheel hydraulic braking torque Thf, and the rear-wheel braking torque TR reduced by setting the rear-wheel regenerative braking torque Tr to the rear-wheel regeneration limit torque TL1 is complemented with the rear-wheel hydraulic braking torque Thr.

After S25, at S26 corresponding to the transmission torque control means 126, it is determined whether at least one of the front-side drive wheels 30 and the rear-side drive wheels 32 is locked, i.e., whether slippage occurs.

If the determination at S26 is negative, this routine is terminated, and if the determination is affirmative, S9 and later are executed.

According to the electronic control device 10 of the standby four-wheel drive vehicle 6 of this embodiment, the constituent elements other than those described above are the same as the first embodiment and, since the transmission torque control means 126 is included that causes the control coupling device 54 to set the transmission torque between the drive source of the vehicle and the front-side drive wheels 30 to zero to allow only the rear-wheel drive wheels 32 to perform the regenerative braking if the braking command torque To calculated by the braking command torque calculating means 124 is equal to or lower than the predetermined rear-wheel regeneration limit torque TL1 during the regenerative braking by the motor generator M, the control coupling device 54 is not operated if the braking command torque To is equal to or lower than the primary-drive-wheel regeneration limit torque TL1, thereby achieving the effect of reducing an amount of electric power consumed for operating the control coupling device 54 as compared to, for example, the case of operating the control coupling device 54 such that the regenerative braking is performed by using both the front-side drive wheels 30 and the rear-side drive wheels 32 during the regenerative braking of the motor generator M, as is the case with the first embodiment. In the two-wheel drive state when the regenerative braking is performed with the front-side drive wheels 30, a power transmission loss is reduced as compared to the four-wheel drive state when the regenerative braking is performed by the front-side drive wheels 30 and the rear-side drive wheels 32, thereby achieving the effect of increasing the regenerative efficiency of the motor generator M as is the case with the first embodiment. Therefore, fuel economy is improved.

According to the electronic control device 10 for a standby four-wheel drive vehicle 6 of the present embodiment, when the braking command torque To exceeds the predetermined primary-drive-wheel regeneration limit torque TL1, if a difference between the front-wheel rotation speed Nf and the rear-wheel rotation speed Nr is equal to or lower than the differential rotation number correction value k1, the transmission torque control means 126 fixes the control coupling torque Tc of the control coupling device 54 to increase the rear-wheel regenerative braking torque Tr and, as a result, the same regenerative amount is acquired as is the case with a full-time four-wheel drive vehicle, thereby increasing a regenerative amount to improve fuel economy.

Third Embodiment

In FIG. 4, when determining whether the value acquired by subtracting the differential rotation number correction value k1 from the front-wheel rotation speed Nf exceeds the rear-wheel rotation speed Nr, if the determination is affirmative, the transmission torque control means 126 of this embodiment calculates respective loads acting on the front-side drive wheels 30 and the rear-side drive wheels 32, i.e., a front-wheel affecting load Ff and a rear-wheel affecting load Fr, based on a deceleration G of the vehicle supplied from the acceleration sensor in accordance with a relationship stored in advance, i.e., the following Equations (1) to (3). In the following Equations (1) to (3), Wf is a load acting on the front-side drive wheels 30 when the standby four-wheel drive vehicle 6 remains still on a level road surface, i.e., a static front-wheel load. Wr is a load acting on the rear-side drive wheels 30 when the standby four-wheel drive vehicle 6 remains still on a level road surface, i.e., a static rear-wheel load. W is a weight of the standby four-wheel drive vehicle 6, i.e., a vehicle weight. H is a height of the gravity center from a road surface, i.e., a vehicle gravity center height. L is a wheelbase of the standby four-wheel drive vehicle 6.

$$Ff = Wf + \Delta W \quad (1)$$

$$Fr = Wr + \Delta W \quad (2)$$

$$\Delta W = W*G*(H/L) \quad (3)$$

Figure 10:
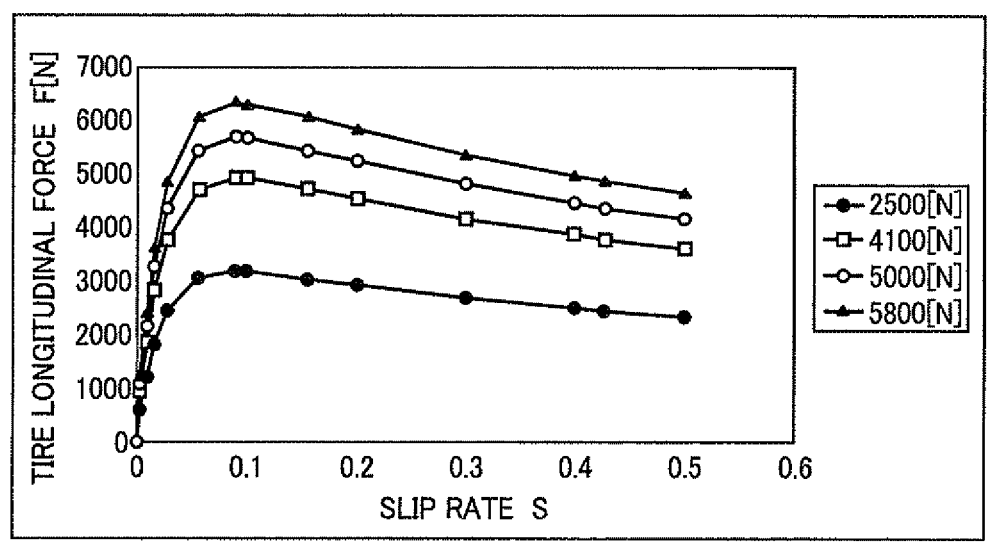
FIG. 10 depicts a tire characteristic map in which a plurality of the tire characteristic lines (F-S lines) that show relationships between the tire longitudinal force and the slip rate empirically obtained in advance using the loads acting on tires as parameters are stored for respective loads.

The transmission torque control means 126 selects respective tire characteristic lines, i.e., F-S lines representative of tire characteristics of the front-side drive wheels 30 and the rear-side drive wheels 32 based on the calculated front-wheel affecting load Ff and rear-wheel affecting load Fr from a predetermined tire characteristic map as depicted in FIG. 10, for example. Within two-dimensional coordinates of a tire longitudinal force axis indicative of a braking force acting on a contact area of a tire on a road surface, i.e., an absolute value of a tire longitudinal force (hereinafter referred to as tire longitudinal force) F, and a slip rate axis indicative of a tire slip rate S, the F-S lines are relationships between the tire longitudinal force F and the slip rate S empirically obtained and stored in advance using the loads acting on tires (the front-wheel affecting load Ff and the rear-wheel affecting load Fr) as parameters. FIG. 10 depicts a portion (four lines) of a plurality of the F-S lines stored for respective loads acting on the tires. In other words, the F-S lines are depicted when the loads acting on the tires are 2500 [N], 4100 [N], 5000 [N], and 5800 [N].

The transmission torque control means 126 controls the control coupling torque Tc of the control coupling device 54 such that a value acquired by subtracting the correction value k2 from the front-wheel rotation speed Nf becomes equal to the rear-wheel rotation speed Nr based on the actual front-wheel braking torque TF and the rear-wheel braking torque TR from each of the selected F-S lines. In other words, the front-wheel regenerative braking torque Tf is increased as quickly as possible by increasing the control clutch torque Tc as quickly as possible within a range satisfying the condition that enables the control coupling device 54 to transmit the control coupling torque Tc, i.e., within a range where the value acquired by subtracting the correction value k1 from the front-wheel rotation speed Nf is equal to or greater than the rear-wheel rotation speed Nr in this embodiment. Specifically, the transmission torque control means 126 calculates each of braking forces acting on tires of the front-side drive wheels 30 and the rear-side drive wheels 32, i.e., the tire longitudinal forces F, based on the actual front-wheel braking torque TF and the rear-wheel braking torque TR. The transmission torque control means 126 then calculates each of the slip rates S of the front-side drive wheels 30 and the rear-side drive wheels 32 based on the calculated tire longitudinal forces F from the selected F-S lines. The transmission torque control means 126 estimates change amounts of the front-wheel rotation speed Nf and the rear-wheel rotation speed Nr after a given time from the calculated slip rates S and calculates rotation speeds of the front and rear wheels after the given time, i.e., an arithmetically estimated front-wheel rotation speed Nf1 and an arithmetically estimated rear-wheel rotation speed Nr1. The transmission torque control means 126 provides feedforward control to control the control coupling torque Tc of the control coupling device 54 such that the value acquired by subtracting the correction value k2 from the arithmetically estimated front-wheel rotation speed Nf1 becomes equal to the arithmetically estimated rear-wheel rotation speed Nr1.

Figure 11:
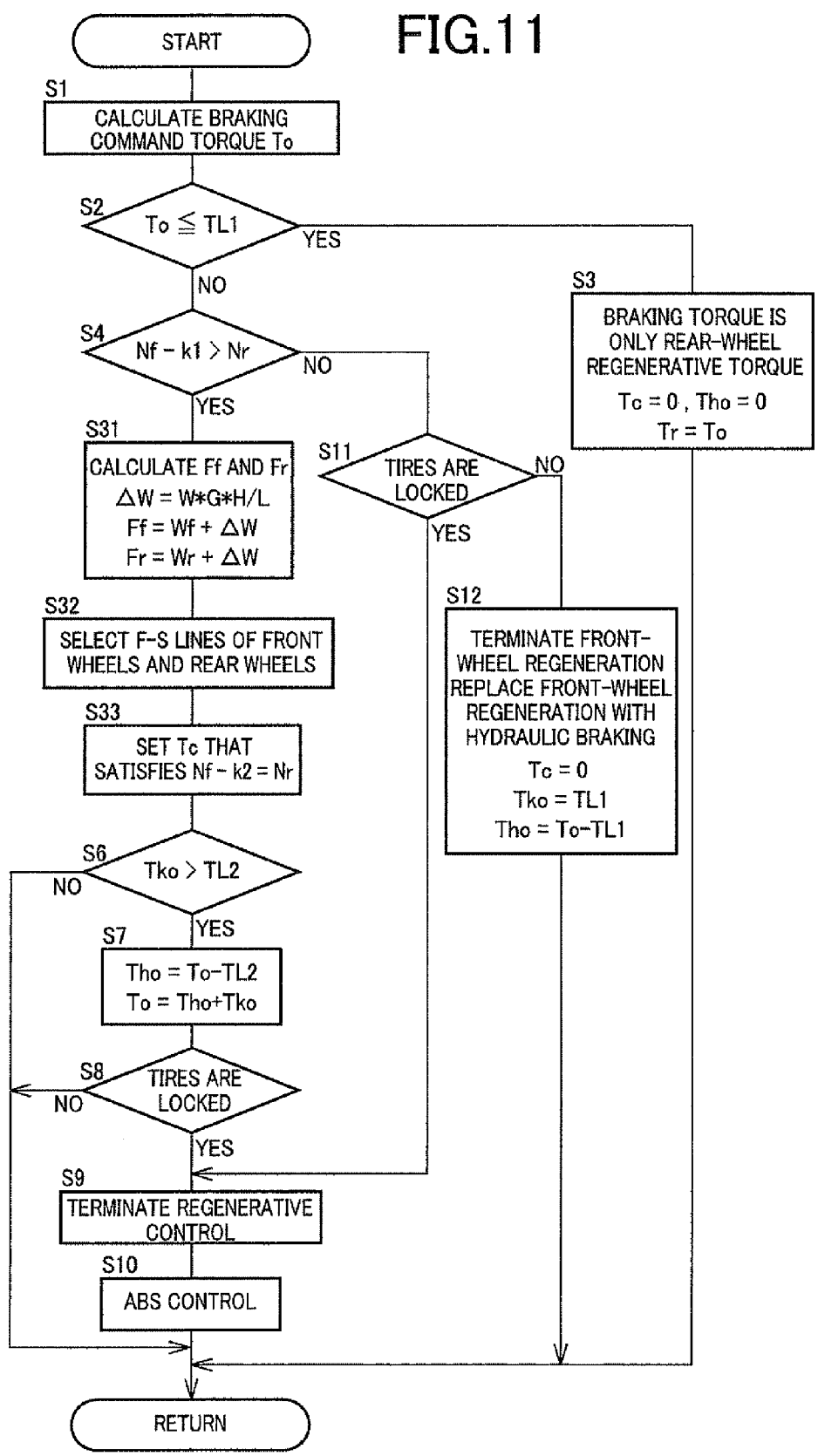
FIG. 11 is a flowchart for explaining a main portion of the control operation of the electronic control device of another embodiment of the present invention.

FIG. 11 is a flowchart for explaining a main portion of the control operation of the electronic control device 10 of this embodiment, corresponding to FIG. 5 of the first embodiment. As is the case with the first embodiment, this flowchart is repeatedly executed with an extremely short cycle time, for example, on the order of few msec to a few tens of msec, if one determination is affirmative between whether the brake pedal 96 is stepped on and whether the accelerator pedal is completely returned.

In FIG. 11, if the determination at S4 is negative, at S31 corresponding to the transmission torque control means 126, the respective loads acting on the front-side drive wheels 30 and the rear-side drive wheels 32, i.e., the front-wheel affecting load Ff and the rear-wheel affecting load Fr are calculated based on the deceleration G of the vehicle supplied from the acceleration sensor in accordance with the relationship stored in advance, i.e., Equations (1) to (3).

After S31, at S32 corresponding to the transmission torque control means 126, the respective tire characteristic lines, i.e., the F-S lines representative of tire characteristics of the front-side drive wheels 30 and the rear-side drive wheels 32 are selected based on the front-wheel affecting load Ff and the rear-wheel affecting load Fr calculated at S31 from the tire characteristic map as depicted in FIG. 10, for example.

After S32, at S33 corresponding to the transmission torque control means 126, the control coupling torque Tc of the control coupling device 54 is controlled such that the value acquired by subtracting the correction value k2 from the front-wheel rotation speed Nf becomes equal to the rear-wheel rotation speed Nr based on the actual front-wheel braking torque TF and the rear-wheel braking torque TR from each of the F-S lines selected at S32. Specifically, first, each of the tire longitudinal forces F acting on tires of the front-side drive wheels 30 and the rear-side drive wheels 32 is calculated based on the actual front-wheel braking torque TF and the rear-wheel braking torque TR. Each of the slip rates S of the front-side drive wheels 30 and the rear-side drive wheels 32 is then calculated based on the calculated tire longitudinal forces F from the selected F-S lines. The rotation speeds of the front and rear wheels after the given time, i.e., the arithmetically estimated front-wheel rotation speed Nf1 and the arithmetically estimated rear-wheel rotation speed Nr1 are then calculated from the calculated slip rates S. The feedforward control is then provided to control the control coupling torque Tc of the control coupling device 54 such that a value acquired by subtracting the correction value k2 from the arithmetically estimated front-wheel rotation speed Nf1 becomes equal to the arithmetically estimated rear-wheel rotation speed Nr1. As a result, the front-wheel regenerative braking torque Tf is increased as quickly as possible by increasing the control clutch torque Tc as quickly as possible within a range satisfying the condition that enables the control coupling device 54 to transmit the control coupling torque Tc, i.e., within a range where the value acquired by subtracting the correction value k2 from the front-wheel rotation speed Nf is equal to or greater than the rear-wheel rotation speed Nr in this embodiment.

Figure 12:
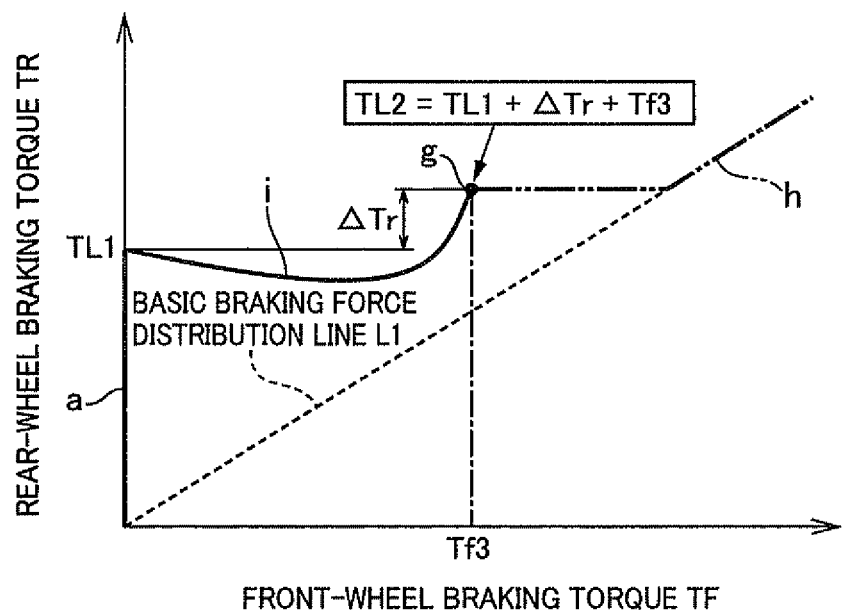
FIG. 12 is a diagram of values of the front-wheel braking torque and the rear-wheel braking torque continuously varied because of the control operation of the electronic control device in accordance with the flowchart of FIG. 11, along with the predetermined basic braking force distribution line.

FIG. 12 is a diagram of values of the front-wheel braking torque TF and the rear-wheel braking torque TR continuously varied because each of the control coupling device 54, the front-wheel hydraulic brake 92, and the rear-wheel hydraulic brake 90 is controlled by the control operation of the electronic control device 10 in accordance with the flowchart of FIG. 11, along with the predetermined basic braking force distribution line L1. As depicted in FIG. 12, when the determination at S2 of FIG. 11 is negative and the determination at S4 is affirmative, S31 to S33 are repeatedly executed and each of the front-wheel braking torque TF and the rear-wheel braking torque TR is controlled along a solid line i, for example. S31 to S33 of FIG. 11 are repeatedly executed until it is determined that a sum of the rear-wheel regeneration limit torque TL1, the incremental value ΔTr, and a front-wheel braking torque Tf3 exceeds the regeneration limit torque TL2 at, for example, the point g where the rear-wheel braking torque TR is a sum of the rear-wheel regeneration limit torque TL1 and the incremental value ΔTr and the front-wheel braking torque TF is the front-wheel braking torque Tf3 and, as a result, the front-wheel braking torque TF and the rear-wheel braking torque TR are increased and decreased along the solid line i of FIG. 12.

According to the electronic control device 10 of the standby four-wheel drive vehicle 6 of this embodiment, since the constituent elements other than those described above are the same as the first embodiment, the effect of reducing an amount of electric power consumed for operating the control coupling device 54 is achieved as compared to, for example, the case of operating the control coupling device 54 such that the regenerative braking is performed by using both the front-side drive wheels 30 and the rear-side drive wheels 32 during the regenerative braking of the motor generator M, as is the case with the first embodiment. The effect of increasing the regenerative efficiency of the motor generator M is also achieved as is the case with the first embodiment. Therefore, fuel economy is improved.

According to the electronic control device 10 for a standby four-wheel drive vehicle 6 of the present embodiment, if the braking command torque To exceeds the primary-drive-wheel regeneration limit torque TL1, the transmission torque control means 126 controls the control coupling torque Tc of the control coupling device 54 to adjust the front-wheel regenerative braking torque Tf such that a value acquired by subtracting a predetermined given correction value k1 from the front-wheel rotation speed Nf becomes equal to the rear-wheel rotation speed Nr; as a result, the control coupling torque Tc of the control coupling device 54 is increased as quickly as possible within a range satisfying the condition that enables the control coupling device 54 to transmit the regenerative braking torque, i.e., within a range where the value acquired by subtracting the given correction value k2 from the front-wheel rotation speed Nf exceeds the rear-wheel rotation speed Nr; and, therefore, the front-wheel regenerative braking torque Tf is increased as quickly as possible, thereby making the regenerative braking of the front-side drive wheels 30 effective as much as possible.

Although the exemplary embodiments of the present invention have been described in detail with reference to the drawings, the present invention is not limited to the embodiments and may be implemented in another form.

For example, although the braking command torque To is calculated and the controls are provided such that the braking command torque To is acquired in the embodiments, a braking force, a deceleration, etc., may be calculated as a value related to the braking torque so as to provide the controls, for example.

Although the pilot clutch portion 72 of the control coupling device 54 is an electromagnetic clutch in the embodiments, the pilot clutch portion 72 may be a hydraulic clutch or a magnetic particle clutch, for example. Although the control coupling device 54 is of a pilot clutch type, this is not a limitation and, for example, the control coupling device 54 may be of a clutch direct pressing type having the main clutch portion 76 pressed and engaged by a hydraulic or electric actuator, for example. If the control coupling device 54 is of a clutch direct pressing type, the relative rotation speed condition of the front-side drive wheels 30 and the rear-side drive wheels 32 enabling the control coupling device 54 to transmit a regenerative braking torque is as depicted in FIG. 3.

Although the present invention is used in a four-wheel drive vehicle based on a front-engine rear-drive system (FR) in the embodiments, this is not a limitation and the present invention may preferably be used in a front/rear-wheel drive vehicle based on a front-engine front-drive system (FF).

In the embodiments, a transmission may be disposed on a power transmission path between the drive source of the vehicle and the drive wheels. For example, a stepped automatic transmission or a stepless transmission such as CVT may be disposed between the power transmission device 14 and the transfer 16.

In the embodiments, the rear-wheel regeneration limit torque TL1 may empirically be obtained as a limit value, i.e., an upper limit for stabilizing the behavior of the vehicle when the regenerative control is provided by using only the rear drive wheels 32 in the two-wheel drive state on a bad road such as a low friction road, for example. As a result, the behavioral stability of the vehicle can more certainly be ensured.

The embodiments described above are merely exemplary embodiments and, although not exemplarily illustrated one by one, the present invention can be implemented with various modifications and improvements applied without departing from the spirit thereof based on the knowledge of those skilled in the art.

NOMENCLATURE OF REFERENCE SIGNS

6: standby four-wheel drive vehicle
10: electronic control device (drive control device)
30: front-side drive wheels (secondary drive wheels)
32: rear-side drive wheels (primary drive wheels)
54: control coupling device (clutch device)
90: rear-wheel hydraulic brake (primary-drive-wheel hydraulic brake)
92: front-wheel hydraulic brake (secondary-drive-wheel hydraulic brake)
126: transmission torque control means
128: hydraulic brake control means
L1: basic braking torque distribution line (basic braking force distribution line)
M1: first motor generator M2: second motor generator
Nf: front-wheel rotation speed
Nr: rear-wheel rotation speed
Rd: distribution ratio
TL1: rear-wheel regeneration limit torque (primary-drive-wheel regeneration limit torque)
TL2: regeneration limit torque
Tc: control coupling torque (transmission torque)
Tf, Tf1, Tf2, Tf3: front-wheel regenerative braking torque (regenerative braking torque of secondary drive wheels)
To: braking command torque (request braking torque)
Tr: rear-wheel regenerative braking torque (regenerative braking torque of primary drive wheels)
k1: differential rotation number correction value
k2: correction value

The invention claimed is:

1. A drive control device for a standby four-wheel drive vehicle having primary drive wheels coupled to a drive source including a motor generator that generates a regenerative braking torque and a clutch device disposed between the drive source and secondary drive wheels to switch a two-wheel drive state using the primary drive wheels and a four-wheel drive state using the primary drive wheels and the secondary drive wheels, comprising:
an electronic control device which serves as a transmission torque control portion having a first regenerative braking control portion and a second regenerative braking control portion, wherein
the first regenerative braking control portion causes the clutch device to set a transmission torque between the drive source and the secondary drive wheels to zero so as to allow only the primary drive wheels to perform regenerative braking when a request braking torque of the vehicle is equal to or lower than a predetermined primary-drive-wheel regeneration limit torque during the regenerative braking by the motor generator,
the second regenerative braking control portion causes the clutch device to generate the transmission torque between the drive source and the secondary drive wheels so as to allow the primary drive wheels and the secondary drive wheels to perform the regenerative braking when the request braking torque exceeds the primary-drive-wheel regeneration limit torque, and
the second regenerative braking control portion controls the transmission torque of the clutch device to adjust a regenerative braking torque of the secondary drive wheels such that a value acquired by subtracting a predetermined given correction value from a rotation speed of the secondary drive wheels becomes substantially equal to a rotation speed of the primary drive wheels, when the request braking torque exceeds the primary-drive-wheel regeneration limit torque.

2. The drive control device for a standby four-wheel drive vehicle of claim 1, wherein when a value acquired by subtracting a predetermined given differential rotation number correction value from the rotation speed of the secondary drive wheels is greater than the rotation speed of the primary drive wheels, the second regenerative braking control portion increases the transmission torque of the clutch device to increase a regenerative braking torque of the secondary drive wheels.

3. The drive control device for a standby four-wheel drive vehicle of claim 2, wherein
the standby four-wheel drive vehicle includes a primary-drive-wheel hydraulic brake and a secondary-drive-wheel hydraulic brake that respectively generate braking torques for the primary drive wheels and the secondary drive wheels depending on supplied oil pressures, and wherein
a hydraulic brake control portion is included that controls each of the primary-drive-wheel hydraulic brake and the secondary-drive-wheel hydraulic brake such that a distribution ratio of a braking torque of the primary drive wheels and a braking torque of the secondary drive wheels is controlled along a predetermined braking torque distribution line if the request braking torque exceeds a predetermined regeneration limit torque.

4. The drive control device for a standby four-wheel drive vehicle of claim 2, wherein when the request braking torque exceeds the primary-drive-wheel regeneration limit torque, and a difference between the rotation speed of the secondary drive wheels and the rotation speed of the primary drive wheels is equal to or lower than the differential rotation number correction value, the first regenerative braking control portion fixes the transmission torque of the clutch device to increase the regenerative braking torque of the primary drive wheels.

5. The drive control device for a standby four-wheel drive vehicle of claim 1, wherein
the standby four-wheel drive vehicle includes a primary-drive-wheel hydraulic brake and a secondary-drive-wheel hydraulic brake that respectively generate braking torques for the primary drive wheels and the secondary drive wheels depending on supplied oil pressures, and wherein
a hydraulic brake control portion is included that controls each of the primary-drive-wheel hydraulic brake and the secondary-drive-wheel hydraulic brake such that a distribution ratio of a braking torque of the primary drive wheels and a braking torque of the secondary drive wheels is controlled along a predetermined braking torque distribution line if the request braking torque exceeds a predetermined regeneration limit torque.

6. The drive control device for a standby four-wheel drive vehicle of claim 5, wherein when the request braking torque exceeds the primary-drive-wheel regeneration limit torque, and a difference between the rotation speed of the secondary drive wheels and the rotation speed of the primary drive wheels is equal to or lower than the differential rotation number correction value, the first regenerative braking control portion fixes the transmission torque of the clutch device to increase the regenerative braking torque of the primary drive wheels.

* * * * *